United States Patent Office 3,365,478
Patented Jan. 23, 1968

3,365,478
4-SUBSTITUTED IMINO 2,2-DIORGANO-1,3,2-DITHIASTANNETANES, ARSETANES, AND STIBETANES
William Lindsay Mosby, North Plainfield, N.J., assignor to American Cyanamid Company, Stamford, Conn., a corporation of Maine
No Drawing. Filed July 23, 1965, Ser. No. 474,478
4 Claims. (Cl. 260—429.7)

ABSTRACT OF THE DISCLOSURE

This invention relates to organo-metallic derivatives of unsaturated, carbon-containing dithiols represented by the Formula I:

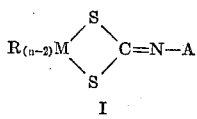

wherein M is a polyvalent metal selected from the group consisting of antimony, arsenic and tin; R is a monovalent hydrocarbyl radical selected from the group consisting of lower alkyl (including cycloalkyl of 4–6 carbons), mono- or bicyclic aromatic (e.g., phenyl and naphthyl as well as lower alkyl substituted analogs), and monocyclic ar(lower alkyl); $n$ is the valence of M; and A is a monovalent radical selected from the group consisting of CN and $SO_2R$.

---

This invention relates to, and has as its object, the provision of new compounds. More particularly, it relates to organo-metallic derivatives of unsaturated, carbon-containing dithiols represented by the Formula I:

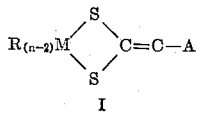

wherein M is a polyvalent metal selected from the group consisting of antimony, arsenic and tin; R is a monovalent hydrocarbyl radical selected from the group consisting of lower alkyl (including cycloalkyl of 4–6 carbons), mono- or bicyclic aromatic (e.g., phenyl and naphthyl as well as lower alkyl substituted analogs), and monocyclic ar(lower alkyl); $n$ is the valence of M; and A is a monovalent radical selected from the group consisting of CN and $SO_2R$.

The compounds of this invention exhibit biocidal properties. Thus, they are bacteriocidal, inhibiting the growth of *E. coli*, *Staph. aureus* and *B. mycoides*; fungicidal, inhibiting growth of *Asper. niger*, *Fusarium moniliforme* and *Penicillium citrinum*; and herbicidal, killing wheat and radish seeds. Accordingly, they can be used agriculturally in conventional formulations as fungicides, herbicides and bacteriocides.

To prepare the compounds of this invention, an alkali metal iminomethylenedithiolate is reacted with a metal dihalide as in the following equation:

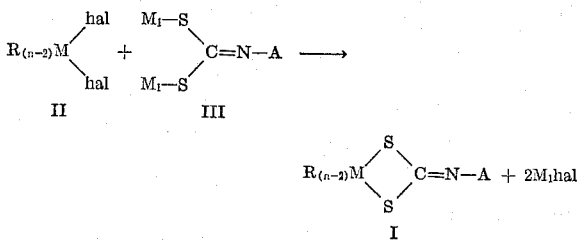

wherein R, M, A and $n$ are as defined above, "hal" is halogen of atomic number above 9, and $M_1$ is an alkali metal such as sodium or potassium. The reaction can be carried out by contacting approximately equimolar amounts of the dihalide and dithiolate in a suitable reaction medium.

Suitable inert reaction media include ethylene glycol, diethyl ether, acetonitrile, dimethylformamide, "Diglyme," dimethylacetamide, dimethylsulfoxide, etc.

When the two reactants are contacted, some heat is usually evolved. Therefore, it is usually advantageous to combine the reactants at room temperature. Under certain conditions, it may be necessary to provide a cooling means to remove the heat of reaction. In a few cases, it may be necessary to apply heat to promote the completion of the reaction. Temperatures between room temperature and the boiling point of the reaction medium may be used. The reactions are rapid and usually require only a short time for completion.

The reaction products may be isolated by any convenient means. It is advantageous to add water, when a water-miscible reaction medium has been used, whereupon the product precipitates, if it is not already precipitated.

Suitable dithiolates are alkali metal derivatives of 1,1-iminomethylenediols such as 1,1-dimercapto-N-cyanomethyleneimine and 1,1-dimercapto - N - p-tolylsulfonylmethyleneimine.

Five types of organo-metallic dihalides may be used in the preparation of the compounds of this invention. They are shown in the following general formulae:

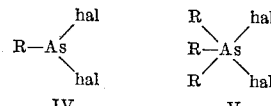
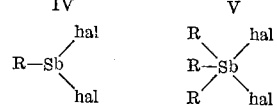

Accordingly, five main types of compounds of Formula I can be obtained by varying the particular dihalide which is reacted with the dithiolate. The types are shown in the following formulae:

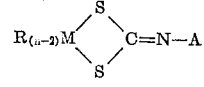
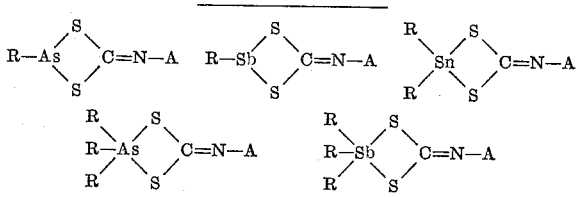
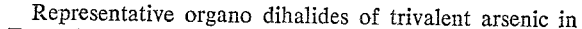
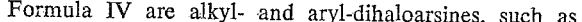

Representative organo dihalides of trivalent arsenic in Formula IV are alkyl- and aryl-dihaloarsines, such as methyldichloroarsine, methyldiiodoarsine, methyldichloroarsine, ethyldibromoarsine, amyldibromoarsine, heptyldichloroarsine, trifluoromethyldibromoarsine, ethoxyethyldichloroarsine, phenyldibromoarsine, phenyldiiodoarsine, phenyldichloroarsine, o-tolyldichloroarsine, 2-naphthyldichloroarsine, p-chlorophenyldichloroarsine, m-nitrophenyldichloroarsine, 2,5 - dimethylphenyldichloroarsine, 4-acetamidophenyldichloroarsine, benzyldichloroarsine, etc.

Representative organo dihalides of pentavalent arsenic in Formula V are trialkyl- and triaryl-dihaloarsenic compounds, such as trimethyldichloroarsenic, trimethyldibromoarsenic, triethyldiiodoarsenic, diethylphenyldichloroarsenic, diphenylethyldichloroarsenic, ethylphenyl-p-tolyldichloroarsenic, triphenyldichloroarsenic, tri-p-tolyldichloroarsenic, tri-1-naphthyldichloroarsenic, etc.

Representative organo dihalides of trivalent antimony in Formula VI are alkyl- and aryl-dihalostibines, such as methyldichlorostibine, ethyldichlorostibine, phenyldiiodostibine, p-nitrophenyldichlorostibine, p-tolyldichlorostibine, p-ethylphenyldichlorostibine, 2-naphthyldichlorostibine, etc.

Representative organo dihalides of pentavalent antimony in Formula VII are trialkyl- and triaryl-dihaloantimony compounds, such as trimethyldibromoantimony, trimethyldichloroantimony, triphenyldibromoantimony, triphenyldichloroantimony, triphenyldiiodoantimony, tris(p-chlorophenyl)dichloroantimony, tri-2,4-xylyldichloroantimony, tri-1-naphthyldibromoantimony, etc.

Representative organo-tin dihalides of Formula VIII are dialkyl- and diaryl-dihalo-tin compounds such as dimethyldichlorotin, diethyldibromotin, dibutyldibromotin, diamyldichlorotin, dioctyldichlorotin, didecyldichlorotin, butylpropyldichlorotin, diphenyldiiodotin, di-p-tolyl-dichlorotin, bis(p-methoxyphenyl)dichlorotin, dibenzyldiiododotin, dicyclohexyldichlorotin, etc.

The following examples in which parts and percentages are by weight, are presented to further illustrate the present invention.

EXAMPLE 1

*4-cyanoimino-2,2-dibutyl-1,3,2-dithiastannetane*

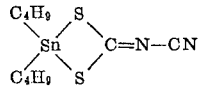

A mixture of 3.04 parts (0.01 mole) of dibutyldichlorotin and 1.94 parts (0.01 mole) of dipotassium cyanodithioimidocarbonate in about 10 parts of dimethylformamide and one part of water. The yellow solution is stirred for about 10 minutes and then diluted with water. The white precipitate is filtered, washed with water and a little methanol and finally with ligroin. The product melts at 151.5–152.5° C.

EXAMPLE 2

*4-cyanoimino-2-phenyl-1,3,2-dithiarsetane*

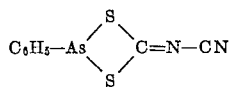

A mixture of 1.94 parts (0.01 mole) of dipotassium cyanodithioimidocarbonate and 4.06 parts (0.01 mole) of phenyldiiodoarsine in about 2 parts of dimethylformamide. After about 10 minutes, the reaction is diluted with about 200 parts of water. The precipitate is filtered and washed with water. The product melts at 93–95.5° C.

EXAMPLE 3

*2,2-dibutyl-4-p-tolylsulfonylimino-1,3,2-dithiastannetane*

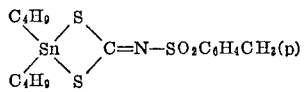

A mixture of 3.04 parts (0.01 mole) of dibutyldichlorotin, 4.00 parts (0.0123 mole) of dipotassium N-p-tolylsulfonyldithioimidocarbonate is triturated in about five parts of dimethylformamide. The reaction mixture is diluted with water, and the gummy precipitate is triturated with water, filtered and dried.

EXAMPLE 4

*4-cyanoimino-2,2,2-triphenyl-1,3,2-dithiastibetane*

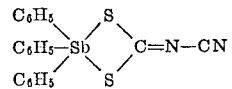

A mixture of 2.12 parts (0.005 mole) of triphenyldichloroantimony and 1.07 parts (0.0055 mole) of dipotassium cyanodithioimidocarbonate in about 5 parts of dimethylformamide is agitated with slight evolution of heat. Water is gradually added. The precipitate is filtered, washed with water, methanol and finally recrystallized from methanol.

EXAMPLE 5

*4-cyanoimino-2,2-dibenzyl-1,3,2-dithiastannetane*

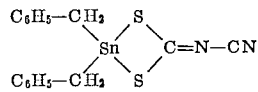

Following the procedure of Example 1, except for the use of an equimolar amount of dibenzyldibromotin as the dihalide, the above product is obtained.

EXAMPLE 6

*4-cyanoimino-2-(2-naphthyl)-1,3,2-stibetane*

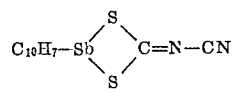

Following the procedure of Example 1, except for the use of an equimolar amount of 2-naphthyldichloroantimony as the dihalide, the above product is obtained.

I claim:

1. A compound of the formula:

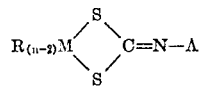

wherein M is a polyvalent metal selected from the group consisting of antimony and arsenic; R is a monovalent hydrocarbyl radical selected from the group consisting of lower alkyl, mono- and bicyclic aromatic, and monocyclic ar(lower alkyl); n is the valence of M; and A is a monovalent radical selected from the group consisting of CN and SO₂R.

2. The compound 4-cyanoimino-2-phenyl-1,3,2-dithiarsetane.

3. The compound 2,2-dibutyl-4-p-tolylsulfonylimino-1,3,2-dithiastannetane.

4. A compound of the formula:

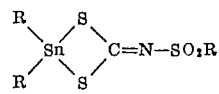

wherein R is a monovalent hydrocarbyl radical selected from the group consisting of lower alkyl, mono- and bicyclic aromatic and monocyclic ar(lower alkyl).

References Cited

UNITED STATES PATENTS 3,311,647  3/1967  Stamm _____ 260—429.7 XR
3,316,284  4/1967  Stamm _____ 260—429.7

TOBIAS E. LEVOW, *Primary Examiner.*

W. F. W. BELLAMY, *Assistant Examiner.*